United States Patent
Okada

(10) Patent No.: US 8,641,200 B2
(45) Date of Patent: Feb. 4, 2014

(54) PROJECTION TYPE DISPLAY DEVICE PROVIDED WITH A UNIT FOR DETECTING CLOGGING OF FILTERS

(75) Inventor: Takayuki Okada, Tokyo (JP)

(73) Assignee: NEC Display Solutions, Ltd., Tokyo (JP)

(*) Notice: Subject to any disclaimer, the term of this patent is extended or adjusted under 35 U.S.C. 154(b) by 363 days.

(21) Appl. No.: 12/737,753

(22) PCT Filed: Aug. 15, 2008

(86) PCT No.: PCT/JP2008/064632
§ 371 (c)(1),
(2), (4) Date: Feb. 14, 2011

(87) PCT Pub. No.: WO2010/018638
PCT Pub. Date: Feb. 18, 2010

(65) Prior Publication Data
US 2011/0141440 A1  Jun. 16, 2011

(51) Int. Cl.
G03B 21/26 (2006.01)
(52) U.S. Cl.
USPC .......................................................... 353/57
(58) Field of Classification Search
USPC .................................................... 353/52–61
See application file for complete search history.

(56) References Cited

U.S. PATENT DOCUMENTS

| | | | |
|---|---|---|---|
| 6,082,342 A | 7/2000 | Duret et al. | |
| 6,319,114 B1 * | 11/2001 | Nair et al. | 454/184 |
| 6,419,364 B2 | 7/2002 | Takizawa et al. | |
| 6,702,444 B2 | 3/2004 | Takizawa et al. | |
| 7,075,596 B2 * | 7/2006 | Hosoda | 349/72 |
| 2001/0043311 A1 * | 11/2001 | Takezawa et al. | 353/30 |

FOREIGN PATENT DOCUMENTS

| | | |
|---|---|---|
| JP | 6-221599 A | 8/1994 |
| JP | 9-155134 A | 6/1997 |
| JP | 10-252513 A | 9/1998 |
| JP | 2000-35613 A | 2/2000 |
| JP | 2003-15224 A | 1/2003 |
| JP | 2005-17547 A | 1/2005 |
| JP | 2005-292589 A | 10/2005 |

OTHER PUBLICATIONS

Chinese Office Action dated Dec. 29, 2011, with English translation.

* cited by examiner

Primary Examiner — Thanh Luu
(74) Attorney, Agent, or Firm — McGinn Intellectual Property Law Group, PLLC

(57) ABSTRACT

A projection type display device includes a lamp, polarization means (21) for converting light emitted from the lamp to polarized light, a liquid crystal panel for modulating the polarized light to form an image light, a projection lens (7) for projecting the image light, fans (11R, 12G, 23B) for taking outside air in and for supplying the outside air to the polarization means and the liquid crystal panel, a filter for collecting dust contained in the outside air, a first detection means for detecting temperature T1 of the outside air, a first control means for controlling the number of revolutions of the fan in response to temperature T1, a second detection means for detecting temperature T2 of the polarization means, a storage means for storing reference temperature T3, and a second control means. The second control means issues a warning or stops the projection type display device when temperature T2 is higher than reference temperature T3.

14 Claims, 10 Drawing Sheets

| comparison of temperature (T2) and reference temperature (T3) | | | determination of state, made on the basis of result of comparison | | | | | operation process of device performed on the basis of determination of state |
|---|---|---|---|---|---|---|---|---|
| temperature (T2) | | reference temperature (T3) | louver | | air filter | | | |
| | | | rate of blocking | determination | rate of clogging | | determination | |
| > | T3_5 | > | — | louver is blocked by foreign substance such as paper | > | 90% | air filter is heavily soiled | stop operation of device |
| | | | 90% | | ∨ | | | display "remove foreign substance/replace air filter" and stop operation of device |
| ∨ | T3_4 | | | | > | 50% | filter needs to be cleaned | display "clean air filter" for several seconds |
| > | T3_3 | | | | ∨ | | | |
| | | | | | > | 30% | filter is normal | nothing is done |
| ∨ | T3_2 | | | | ∨ | | | |
| > | | | | | > | 0% | filter is detached | display "filter is detached" and stop operation of device |
| | | | | | ∨ | | | |
| ∨ | T3_1 | | | | — | — | filter is not yet installed | display "air filter is not yet installed" and stop operation of device |
| > | | | | | — | — | | |
| ∨ | | | | | | | | |

Fig.8 outside temperature detected by temperature sensor: T1 = not less than 25°C but less than 30°C

| reference temperature (T3) | accumulated hours of use L (h) of lamp | | | | | | | | |
|---|---|---|---|---|---|---|---|---|---|
| | 0≦L(h)<250 | 250≦L(h)<500 | 500≦L(h)<750 | 750≦L(h)<1000 | 1000≦L(h)<1250 | 1250≦L(h)<1500 | 1500≦L(h)<1750 | 1750≦L(h)<2000 | L(h)≦2000 |
| T3_5 | 104.0 | 102.0 | 100.0 | 99.0 | 98.0 | 97.5 | 97.0 | 97.0 | 97.0 |
| T3_4 | 88.0 | 86.0 | 84.0 | 83.0 | 82.0 | 81.5 | 81.0 | 81.0 | 81.0 |
| T3_3 | 82.0 | 80.0 | 78.0 | 77.0 | 76.0 | 75.5 | 75.0 | 75.0 | 75.0 |
| T3_2 | 78.0 | 76.0 | 74.0 | 73.0 | 72.0 | 71.5 | 71.0 | 71.0 | 71.0 |
| T3_1 | 73.0 | 71.0 | 69.0 | 68.0 | 67.0 | 66.5 | 66.0 | 66.0 | 66.0 | outside temperature detected by temperature sensor: T1 = not less than 30°C but less than 35°C

| reference temperature (T3) | accumulated hours of use L (h) of lamp | | | | | | | | |
|---|---|---|---|---|---|---|---|---|---|
| | 0≦L(h)<250 | 250≦L(h)<500 | 500≦L(h)<750 | 750≦L(h)<1000 | 1000≦L(h)<1250 | 1250≦L(h)<1500 | 1500≦L(h)<1750 | 1750≦L(h)<2000 | L(h)≦2000 |
| T3_5 | 106.0 | 104.0 | 102.0 | 100.5 | 99.5 | 99.0 | 98.5 | 98.5 | 98.5 |
| T3_4 | 90.0 | 88.0 | 86.0 | 84.5 | 83.5 | 83.0 | 82.5 | 82.5 | 82.5 |
| T3_3 | 84.0 | 82.0 | 80.0 | 78.5 | 77.5 | 77.0 | 76.5 | 76.5 | 76.5 |
| T3_2 | 80.0 | 78.0 | 76.0 | 74.5 | 73.5 | 73.0 | 72.5 | 72.5 | 72.5 |
| T3_1 | 75.0 | 73.0 | 71.0 | 69.5 | 68.5 | 68.0 | 67.5 | 67.5 | 67.5 |

Fig.9

PROJECTION TYPE DISPLAY DEVICE PROVIDED WITH A UNIT FOR DETECTING CLOGGING OF FILTERS

TECHNICAL FIELD

The present invention relates to a projection type display device and, in particular, to a projection type display device provided with a means for detecting clogging of an air filter.

BACKGROUND ART

Many parts (heat generating parts) that generate heat when they are operated are used for a projection type display device. Thus, a general projection type display device is provided with a cooling means for supplying the heat generating parts with cooling air. Specifically, the projection type display device is provided with a fan for taking air in and a channel for introducing the air taken in by the fan into the heat generating parts or their vicinity. Further, in order to keep out dust, an air filter is arranged at an air taking-in port and the channel.

However, when the projection type display device is used in a dusty environment or is used for a long time, the air filter is clogged. When the air filter is clogged, the heat generating part cannot be supplied with sufficient cooling air and hence the temperature of the part is increased. When the temperature of the part is increased, the operation of the part is made unstable or the life of the part is made short. Thus, detecting the clogging of the air filter at an early stage and with reliability is very important for maintaining the performance of the projection type display device and for improving the reliability of the projection type display device.

For example, in JP06-221599 is disclosed a projection type display device which detects the clogging of an air filter on the basis of the result of a comparison of temperature (T1) detected by a thermistor arranged near a liquid crystal light valve and temperature (T2) detected by a thermistor arranged near the air filter (related art 1). When the clogging of the air filter is caused, temperature near the liquid crystal light valve is increased, so that the clogging of the air filter can be detected by comparing temperature (T1) with temperature (T2).

In JP2001-252513 is disclosed a dust detection device which detects the clogging of an air filter on the basis of the result of comparison of pressure (P1) detected by a pressure sensor arranged outside a housing and pressure (P2) detected by a pressure sensor arranged inside the housing (related art 2).

In JP2005-17547 is disclosed an image display device that has a light emitting section and a light receiving section arranged across an air filter and that detects the clogging of an air filter on the basis of a change in the amount of light received by the light receiving section (related art 3). When the air filter is clogged, the amount of light passing through the air filter is decreased, so that the clogging of the air filter can be detected on the basis of a change in the amount of light received.

In JP09-155134 is disclosed a filter winding control device which detects the clogging of an air filter on the basis of a change in the amount of the load of a fan motor (related art 4).

DISCLOSURE OF THE INVENTION

Problem to be Solved by the Invention

However, the above-mentioned related art 1 for detecting an increase in the ambient temperature of a liquid crystal light valve, which is caused by an increase in the temperature of the liquid crystal light valve, has the following problem. When an air filter is suddenly clogged by a large amount of dust or when an air suction port is blocked by a foreign substance such as paper, the temperature of the liquid crystal light valve is increased rapidly. However, the increase in the ambient temperature of the liquid crystal light valve lags behind the increase in the temperature of the liquid crystal light valve. As a result, the clogging of the air filter cannot be found at an early stage. This problem is a problem common to all related arts for detecting the clogging of an air filter on the basis of a change in the temperature of air in a device. Further, temperature detected by a temperature sensor will vary according to the position of the temperature sensor and the flow of the air. Furthermore, the temperature detected by the temperature sensor will also vary according to the state in which the dust is attached to the air filter. Hence, it is difficult to detect the clogging of the air filter with a high degree of accuracy.

Moreover, the above-mentioned related art 2 for detecting the clogging of an air filter on the basis of the difference between pressure inside a housing and pressure outside the housing has the following problem. That is, the housing of a projection type display device is constructed of a plurality of parts and many clearances are formed among the parts. When the air filter is clogged, air flows into the housing through the clearances formed among the parts, so that a difference between pressure P1 and pressure P2 becomes small, which makes it difficult to detect the clogging of the air filter. On the other hand, even if the housing is closed hermetically, when a compact DC fan used frequently for electronic devices is used, the difference between the pressure inside the housing and the pressure outside the housing, which is caused by the clogging of the air filter, becomes small, which makes it difficult to detect the clogging of the air filter.

The above-mentioned related art 3 for detecting the clogging of a filter on the basis of a change in the amount of light received by a light receiving section has the following problem. The entrance of light to the light receiving section is interrupted by dust attached to the light receiving section, or the emission of light from a light emitting section is interrupted by dust attached to the light emitting section. Moreover, even if an air suction port is clogged by a foreign substance such as paper and hence the temperature of a liquid crystal light valve is increased rapidly, a change in the temperature of the liquid crystal light valve cannot be detected.

The above-mentioned related art 4 for detecting the clogging of a filter on the basis of a change in the amount of the load of a fan motor has the following problem. When the fan motor is arranged behind the filter, the amount of the load of the fan motor is increased or decreased sensitively in response to an increase or a decrease in the resistance to the flow of air of the filter. However, when the filter is arranged separately from the fan motor, a change in the amount of the load of the fan motor to the increase or the decrease in the resistance to the flow of air of the filter becomes small, which makes it difficult to detect the clogging of the filter. Further, the electric characteristics of the fan motor can vary or change with time. Hence, it is difficult to detect the clogging of the filter correctly on the basis of a change in the amount of the load of the fan motor.

Means for Solving the Problem

In a projection type display device having a lamp, a polarization means for subjecting light emitted from the lamp to polarization conversion, a liquid crystal panel for modulating the light subjected to the polarization conversion to form an image light, and a projection lens for projecting the image light, the projection type display device includes: a fan for taking air in and for supplying the air taken in to the liquid crystal panel and the polarization means; a filter for collecting dust in the air taken in by the fan; a first detection means for detecting temperature (T1) of the air taken in by the fan; a first control means for controlling the number of revolutions of the fan in response to temperature (T1) detected by the first detection means; a second detection means for detecting temperature (T2) of the polarization means directly or indirectly; a storage means for storing reference temperature (T3) compared with temperature (T2); and a second control means for comparing temperature (T2) with reference temperature (T3) and for controlling the projection type display device on the basis of the result of comparison.

Effect of the Invention

The clogging of an air filter and the abnormality of the air filter can be detected at an early stage and with accuracy.

The above-mentioned and other objects, features, and advantages of the present invention will be made clear with reference to the following description and the accompanying drawings to show one example of the present invention.

BRIEF DESCRIPTION OF THE DRAWINGS

FIG. 8 shows the state of an air filter and a louver determined on the basis of temperature (T2) and an operation process of a device performed on the basis of the result of determination.

FIG. 9 shows examples of a reference temperature compared with temperature (T2).

BEST MODE FOR CARRYING OUT THE INVENTION

Embodiment 1

An example of an embodiment of a projection type display device of the present invention will be described with reference to the drawings.

Figure 1:
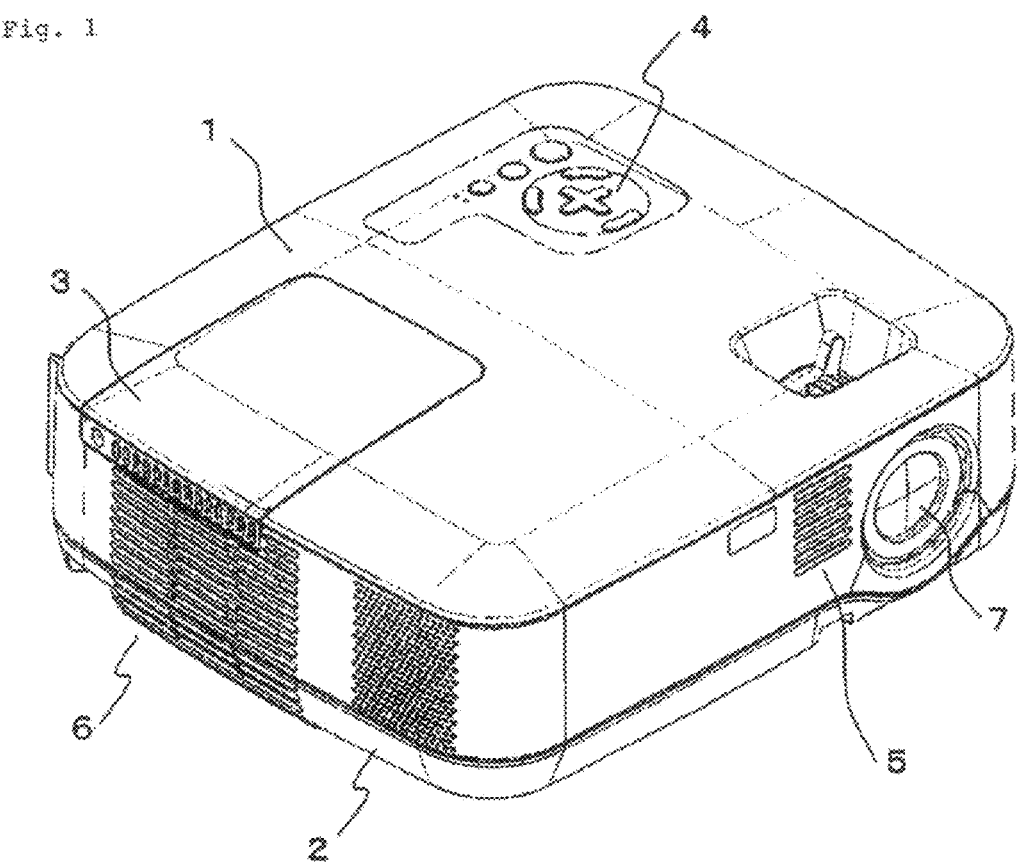
FIG. 1 is a perspective view to illustrate an appearance of a projection type display device.

FIG. 1 is a perspective view to illustrate the appearance of a projection type display device according to the present embodiment. The projection type display device according to the present embodiment is a three-liquid-crystal-panel projection type display device (Three LCD Projector) in which liquid crystal panels are provided in respective colors of red, green, and blue.

Figure 2:
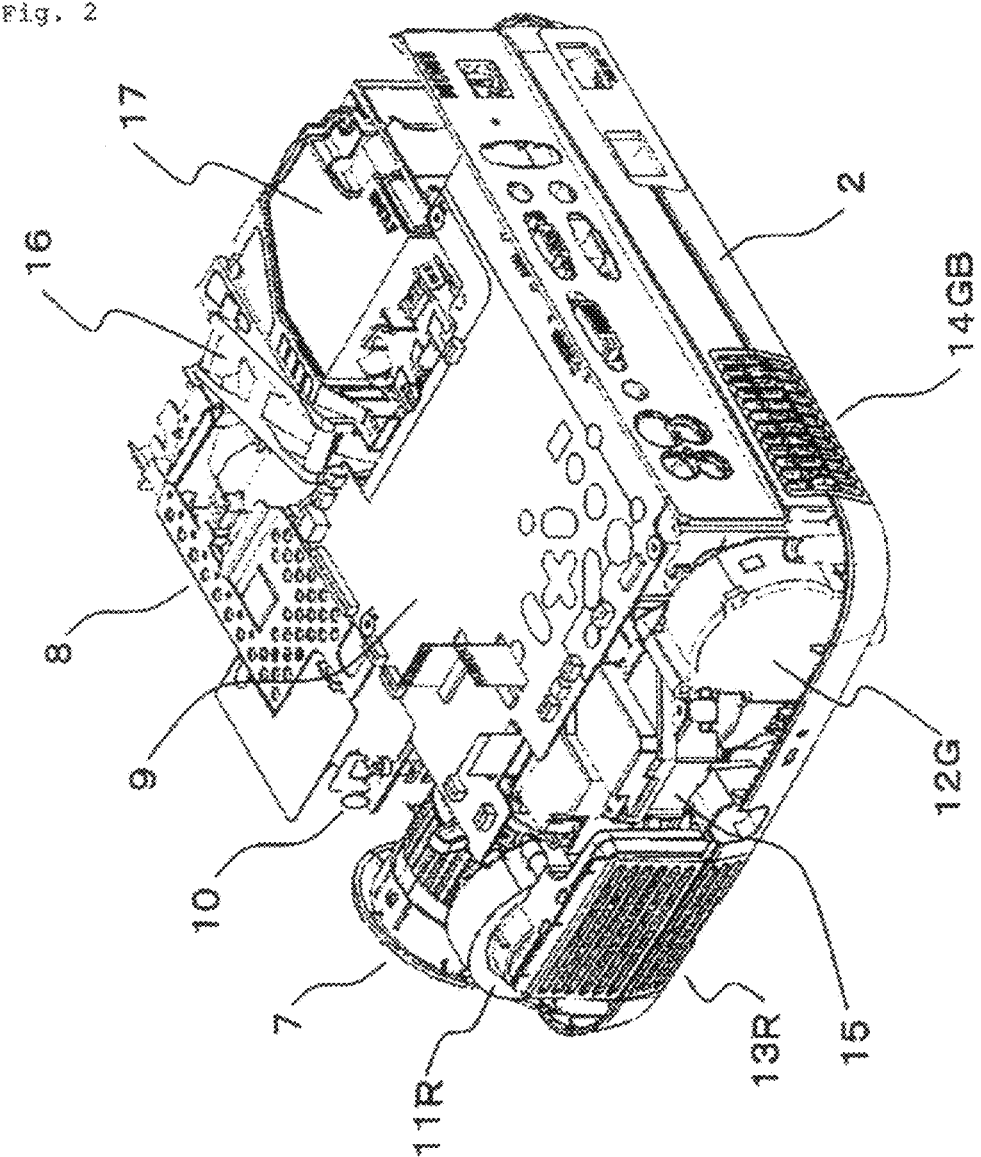
FIG. 2 is a perspective view to illustrate an internal structure of the projection type display device.

FIG. 2 is a perspective view to illustrate the main structure of the interior the housing of the projection type display device. In FIG. 2, upper housing 1 and lamp cover 3 that are illustrated in FIG. 1 are removed. Power source 8 supplies power supplied from the outside to electric circuit board 9 and a ballast (not shown) to make a lamp in a lamp unit (not shown) emit light. The light emitted from the lamp is subjected to optical modulation in optical engine 15. The optically modulated light is projected to a screen through projection lens 7, whereby an image is displayed on the screen. At this time, electric parts and optical parts generate heat and hence need to be cooled. Cooling fan 16 discharges air in the housing to the outside of the housing. Since the air is discharged to the outside of the housing by cooling fan 16, outside air flows in the housing through front air suction port 5 (FIG. 1). Temperature sensor 10 is provided near front air suction port 5. Temperature sensor 10 correctly detects the temperature of the outside air flowing-in from front air suction port 5.

Sirocco fan 11R takes in the outside air through an air filter (not shown) provided inside air suction louver 13R and supplies the outside air to an optical part arranged on an optical path of red light in optical engine 15. Dust in the outside air taken in by sirocco fan 11R is removed by the air filter.

Sirocco fan 12G takes in the outside air through an air filter (not shown) provided inside air suction louver 14GB and supplies the outside air to an optical part arranged on an optical path of green light in optical engine 15. Dust in the outside air taken in by sirocco fan 12G is removed by the air filter.

The cooling of an optical part arranged on an optical path of blue light in optical engine 15 will be described with reference to FIG. 3.

Figure 3:
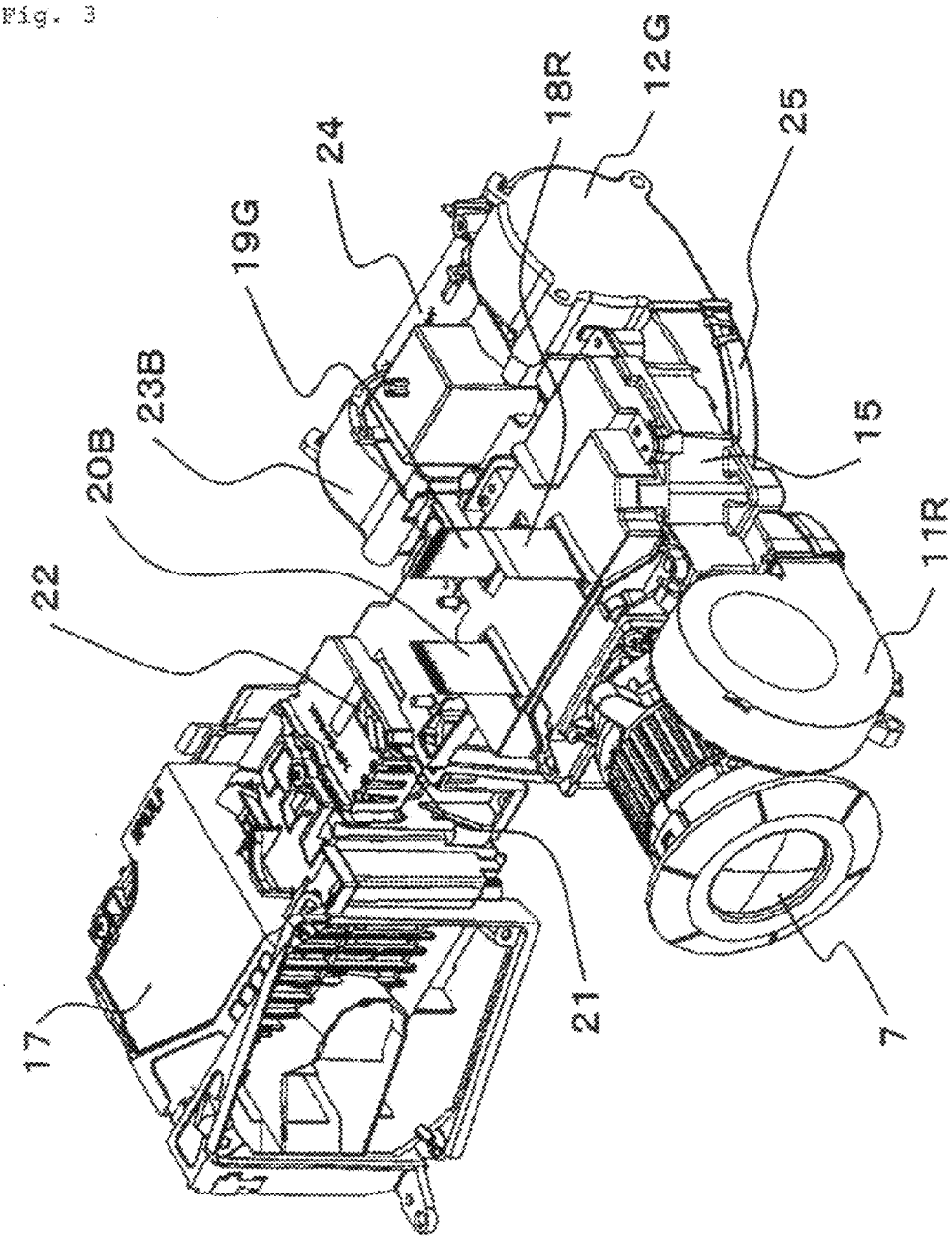
FIG. 3 is a perspective view to illustrate a general structure of an optical engine.

FIG. 3 is a perspective view to illustrate the general structure of optical engine 15. Light emitted from a lamp (not shown) in lamp unit 17 is subjected to polarization conversion by polarization conversion element (PBS/Polarized Beam Splitter) 21 and has the polarization direction aligned. The light subjected to the polarization conversion is split into red light, green light, and blue light. Then, the red light enters liquid crystal panel 18R for red light, the green light enters liquid crystal panel 19G for green light, and the blue light enters liquid crystal panel 20B for blue light. The respective color lights entering the respective liquid crystal panels are modulated by the respective liquid crystal panels. The respective modulated color lights are combined by a cross dichroic prism (not shown) and are projected to the screen.

At this time, the temperatures of the optical parts in optical engine 15 are increased by light loss and electric current. In particular, the temperatures of PBS 21, liquid crystal panels 18R, 19G, 20B, and the optical parts arranged before and behind the respective liquid crystal panels are greatly increased. Thus, the air taken-in from the outside of the housing is supplied to PBS 21, respective liquid crystal panels 18R, 19G, 20B, and the optical parts arranged before and behind the respective liquid crystal panels, thereby cooling them. In the present invention, each of liquid crystal panels 18R, 19G, 20B and the optical parts arranged before and behind each of the liquid crystal panels will be collectively referred to as also "liquid crystal section (LCD section)" in some cases. In the present embodiment, a polarization plate is arranged, respectively, on the side in which the light enters each of liquid crystal panels 18R, 19Q 20B and on the side in which the light is emitted from each of liquid crystal panels 18R, 19G, 20B.

Sirocco fan 11R, sirocco fan 12G, and sirocco fan 23B supply cooling air to the respective liquid crystal sections via air discharge duct unit 25. In other words, sirocco fan 11R, sirocco fan 12G, and sirocco fan 23B cool respective liquid crystal panels 18R, 19Q 20B, and the optical parts (polarization plates) arranged near the respective liquid crystal panels.

A control section (not shown) controls sirocco fan 11R, sirocco fan 12G, and sirocco fan 23B in response to outside air temperature (T1) detected by temperature sensor 10. Specifically, the control section increases or decreases the number of revolutions of the respective sirocco fans in such a way as to prevent the temperatures of the respective liquid crystal sections from varying even if outside air temperature (T1) varies. The relationship between the number of revolutions of each sirocco fan and outside air temperature (T1) is determined on the basis of an experiment conducted in advance and is stored in a storage section. However, the rate of increase in the temperature of the liquid crystal panel and the plurality of optical parts, which compose each liquid crystal section, are not constant. Thus, in the present embodiment, the number of revolutions of each sirocco fan is controlled in such a way as to make the temperature of the liquid crystal panel of each liquid crystal section constant.

In the present embodiment, the air filter made of porous urethane-based foam is provided on the back of air suction louver 13R and air suction louver 14GB illustrated in FIG. 2. Dust in the outside air taken in by the respective sirocco fans is collected by this air filter. In other words, the dust in the cooling air supplied to PBS 21 and the respective liquid crystal sections is collected by this air filter.

The air filter needs to be cleaned so as to recover its performance. When it is difficult for the air filter to recover the performance even if the air filter is cleaned, the air filter needs to be replaced. When the air filter soiled with the dust continues to be used, the volume of the cooling air is decreased and hence the temperatures of PBS 21 and the liquid crystal sections are increased. When the air filter is heavily clogged or the air suction port is blocked by a foreign substance such as paper, the temperatures of PBS 21 and the liquid crystal sections are increased greatly and hence these optical parts are degraded greatly.

Next, the construction of the respective sirocco fans and a duct that supply the cooling air to PBS 21 and the respective liquid crystal sections will be described.

Figure 4:
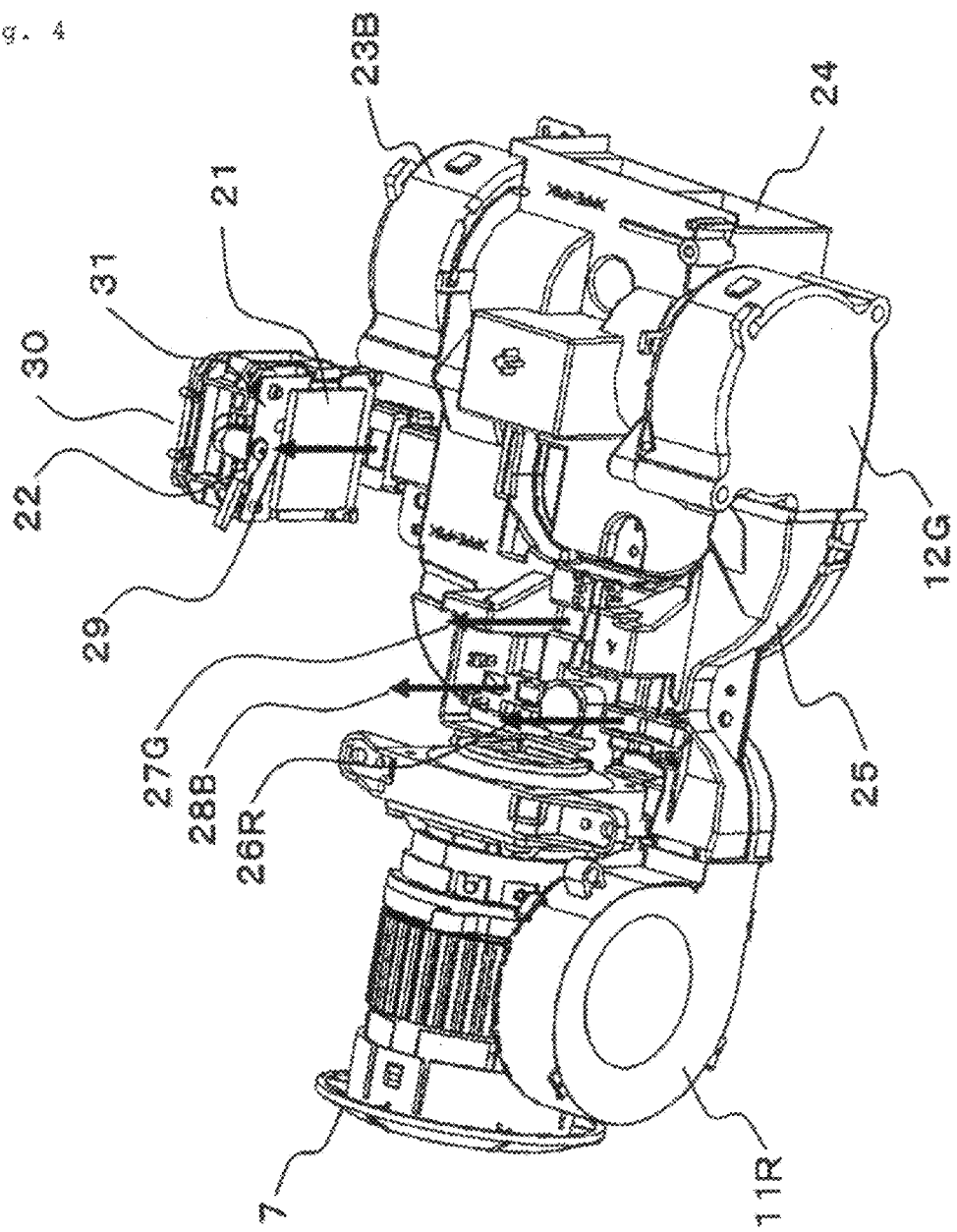
FIG. 4 is a perspective view to illustrate the flow of cooling air supplied to the optical engine.

Solid arrows shown in FIG. 4 show the flow of the cooling air sent from the bottom portion of optical engine 15. The cooling air is blown out upward from an opening formed in the top face of air discharge duct unit 25. Cooling air 26R, cooling air 27G, and cooling air 28B cool the respective liquid crystal sections. Specifically, cooling air 26R cools the liquid crystal section arranged on the optical path of red light (red optical path). Cooling air 27G cools the liquid crystal section arranged on the optical path of green light (green optical path). Cooling air 28B cools the liquid crystal section arranged on the optical path of blue optical path (blue optical path). Cooling air 29 cools PBS 21.

PBS 21 is bonded to aluminum plate 31 held by integrator unit 30. Temperature sensor 22 is fixed to the top of aluminum plate 31 by a screw.

Figure 5:
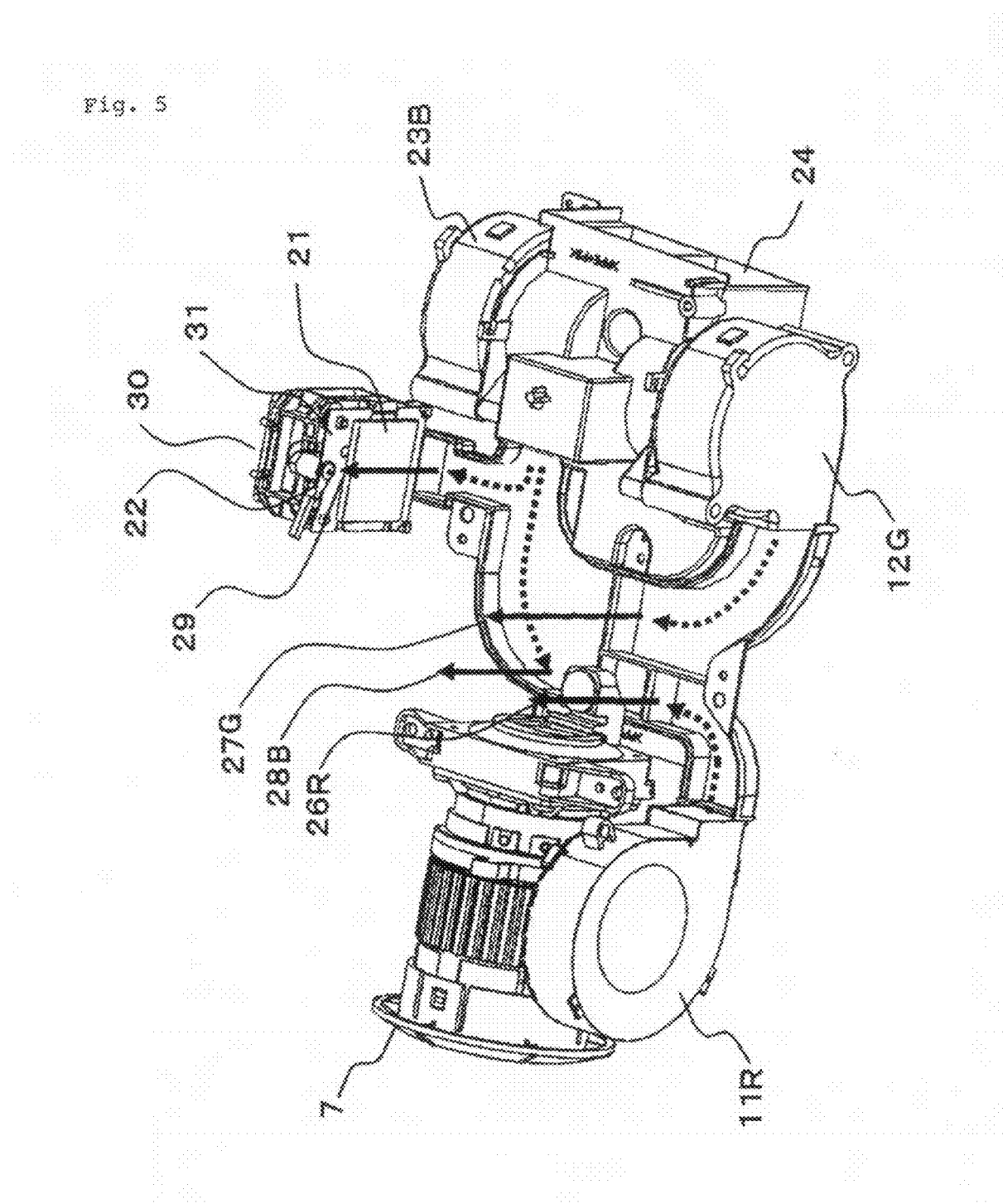
FIG. 5 is a perspective view to illustrate the flow of the cooling air in a duct.

Dotted arrows shown in FIG. 5 show the flow of the cooling air in air discharge duct unit 25. In air discharge duct unit 25 are formed a plurality of independent channels. Furthermore, a channel for supplying the cooling air to PBS 21 is branched from the middle of a channel for the blue optical path.

The air sent out from sirocco fan 11R passes through a channel for the red optical path and is supplied as cooling air 26R to the liquid crystal section arranged on the red optical path. The air sent out from sirocco fan 12G passes through a channel for the green optical path and is supplied as cooling air 27G to the liquid crystal section arranged on the green optical path. The air sent out from sirocco fan 23B passes through a channel for the blue optical path and is supplied as cooling air 28B to the liquid crystal section arranged on the blue optical path. Furthermore, a portion of the air sent from sirocco fan 23B passes through a channel for PBS 21 and is supplied as cooling air 29 to PBS 21.

In the present embodiment, the optical parts arranged on the blue optical path are preferentially cooled. Thus, of cooling air 26R, cooling air 27G and cooling air 28B, cooling air 28B is the largest in volume. Moreover, the volume of cooling air 29 to be supplied to PBS 21 is also added to the outside air taken in by sirocco fan 23B. Thus, in the air filter arranged at the air suction port of air suction duct unit 24, a region communicating with sirocco fan 23B is clogged earlier than a region communicating with sirocco fan 12G. As a result, the temperature of PBS 21 is increased and the increase in the temperature is detected by temperature sensor 22 fixed to aluminum plate 31.

In the present embodiment, the channel for supplying the cooling air to PBS 21 is branched from the channel for the blue optical path. In general, it is important that the optical parts arranged on the blue optical path or the green optical path be cooled. Therefore, it is preferable that the channel for supplying the cooling air to PBS 21 is branched from the channel for the blue optical path or the channel for the green optical path. Moreover, when the channel for the blue optical path and the channel for the green optical path are common to each other, it is preferable that the channel for supplying the cooling air to PBS 21 is branched from the common channel.

Figure 6:
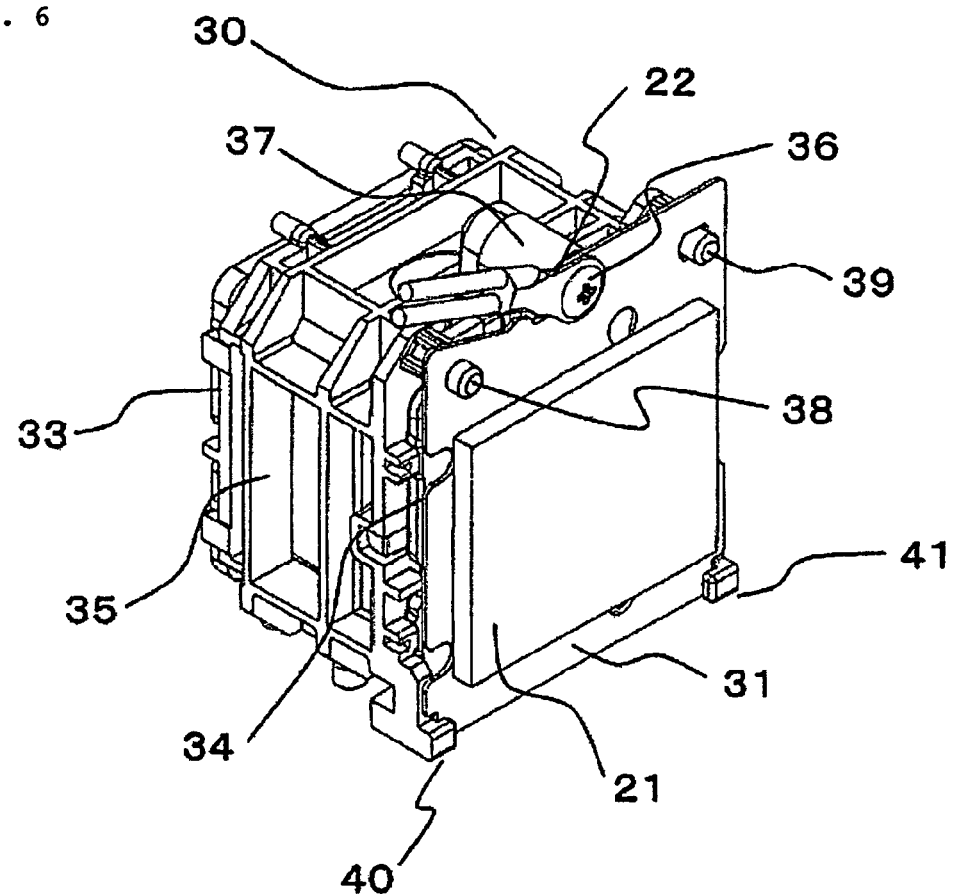
FIG. 6 is a perspective view of an integrator unit.
Figure 7:
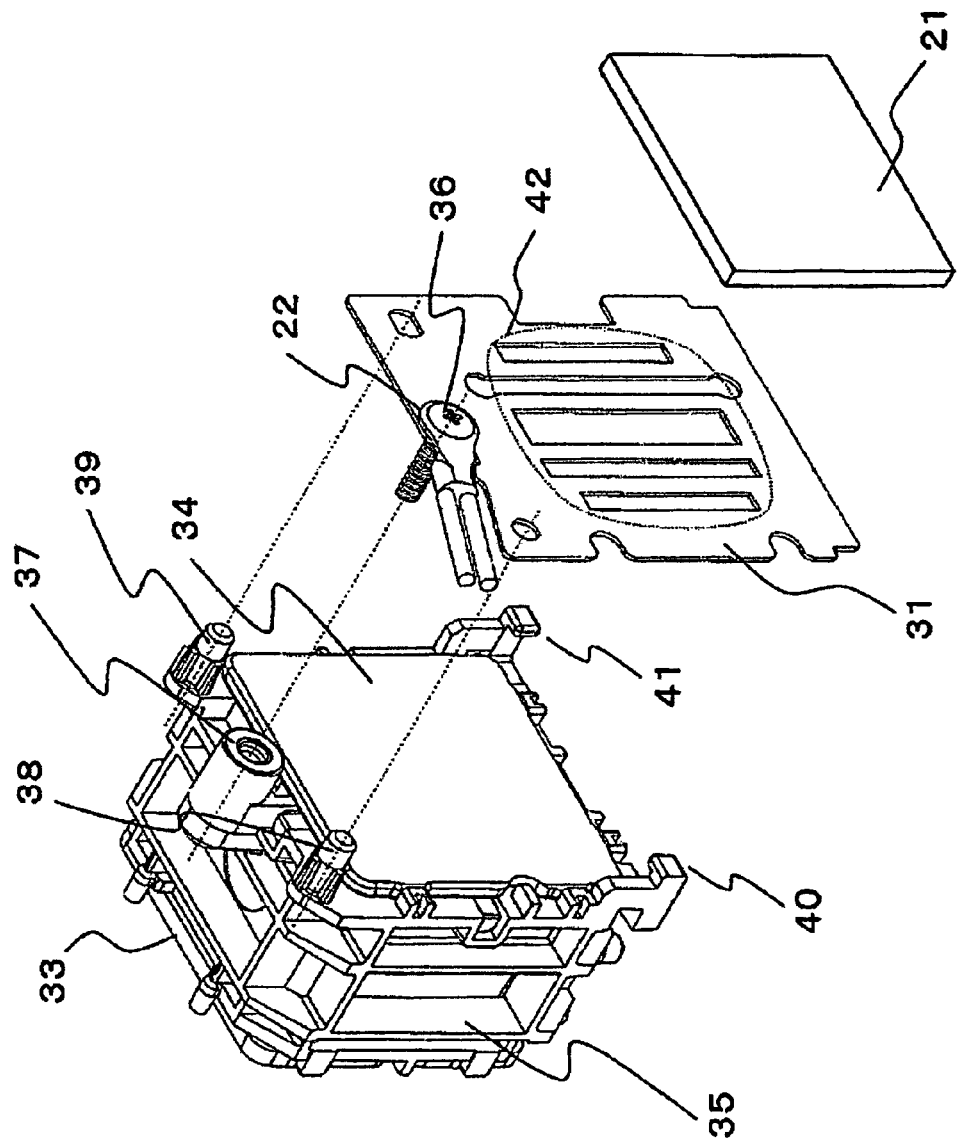
FIG. 7 is an exploded view, in perspective, of the integrator unit.

Next, the structure of integrator unit 30 will be described. FIG. 6 is a perspective view of integrator unit 30. FIG. 7 is a perspective view (exploded view) of integrator unit 30 in which aluminum plate 31 and PBS 21 are removed from integrator unit 30. Integrator lens 33 is positioned and fixed on the lamp side of base member 35 with a high degree of accuracy. Integrator lens 34 is positioned and fixed on the PBS side of base member 35 with a high degree of accuracy. Further, base member 35 has aluminum plate 31 positioned and fixed thereon with a high degree of accuracy. Specifically, two upper portions of aluminum plate 31 are supported by positioning pins 38, 39 provided on base member 35 with a high degree of accuracy. Moreover, two lower portions of aluminum plate 31 are held by holding portions 40, 41 provided on base member 35. Furthermore, aluminum plate 31 is fixed to base member 35 together with temperature sensor 22 by screw 36 screwed in screwed-shut portion 37 of base member 35. PBS 21 is bonded to aluminum plate 31 fixed to base member 35 in the manner described above. Thus, temperature (T2) detected by temperature sensor 22 can be regarded as being equal to the temperature of PBS 21. In other words, the temperature of PBS 21 is indirectly detected by temperature sensor 22. However, a member to which temperature sensor 22 is fixed can be any member if the temperature of the member becomes equal or nearly equal to the temperature of PBS 21 while the projection type display device is operated, so that the member is not limited to aluminum plate 31. Moreover, aluminum plate 31 can be replaced by a plate member made of material other than aluminum. Further, temperature sensor 22 may be fixed to PBS 21 to directly detect the temperature of PBS 21.

Light intercepting portion 42 for removing unnecessary light is formed in the center of aluminum plate 31. The distance between the electrodes of the lamp is increased according to an increase in the hours of use. When the distance between the electrodes of the lamp is increased, unnecessary light is increased, but the increased unnecessary light is intercepted by light intercepting portion 42.

Next, a method of determining the state of the air filter from temperature (T2) detected by temperature sensor 22 and control performed on the basis of the result of determination will be described.

In a central column of a table shown in FIG. 8 is described a state determined on the basis of temperature (T2) detected by temperature sensor 22. In a right column of the same table is described an operation process of the device performed on the basis of the result of determination of the state.

Figure 10:
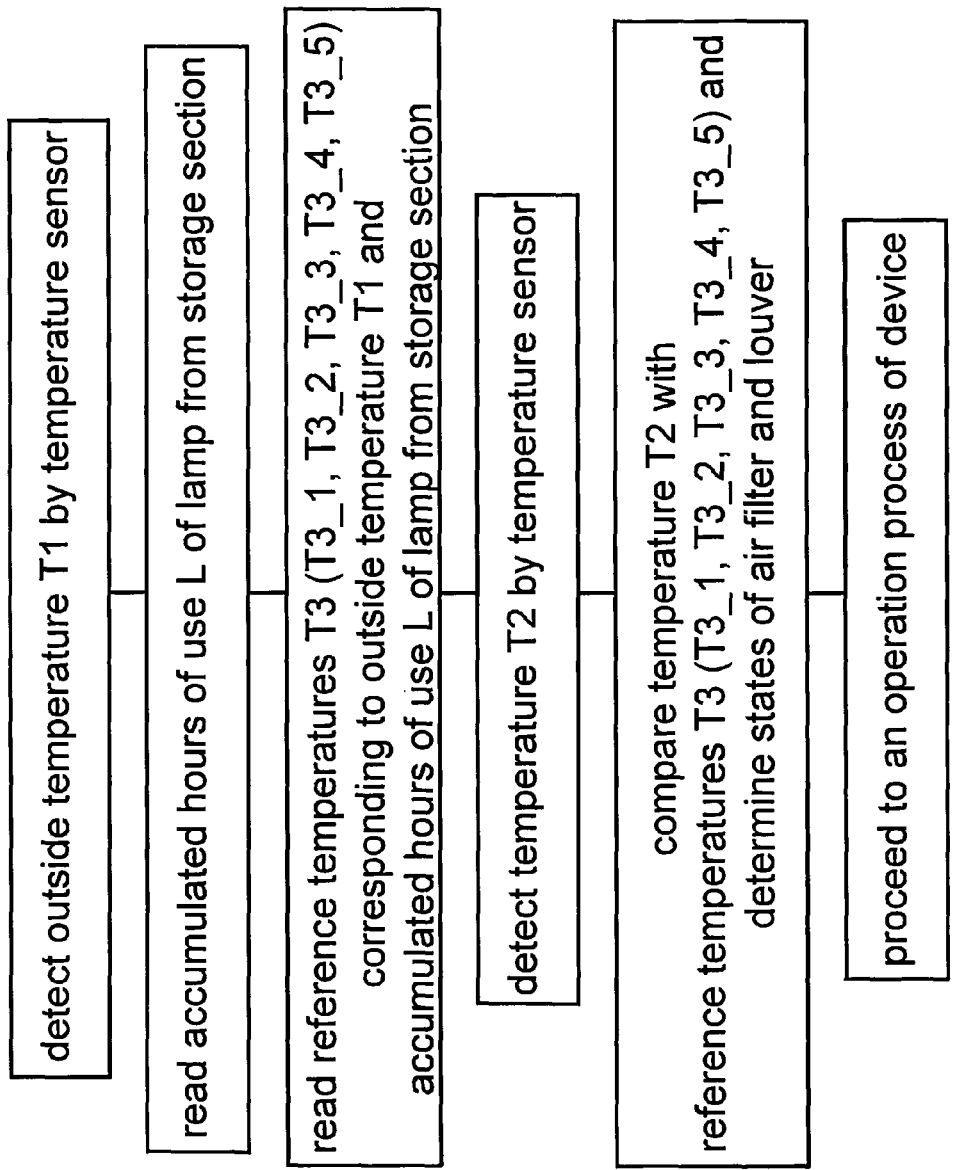
FIG. 10 shows a processing procedure for determining the states of the air filter and the louver.

In a table shown in FIG. 9 is shown a table including a plurality of reference temperatures (T3) compared with temperature (T2) detected by temperature sensor 22. In the present embodiment, two tables are prepared according to outside air temperature (T1). Specifically, a table used when outside air temperature (T1) is not less than 25° C. and less than 30° C. and a table used when outside air temperature (T1) is not less than 30° C. and less than 35° C. are prepared and stored in the storage section. Either table is selected according to outside air temperature (T1), and reference temperature (T3) to be compared with temperature (T2) is selected from among the plurality of references (T3) in the selected table. Reference temperature (T3) to be selected is different depending on outside air temperature (T1) detected by temperature sensor 10 and the accumulated hours of use (L) of the lamp. In FIG. 10 is shown a flow chart of determining the state of the air filter and the louver.

Specific examples of the determination of the state of the air filter and the operation processing of the device will be described with reference to FIG. 8 and FIG. 9.

EXAMPLE 1

Precondition

Outside air temperature (T1)=26° C.
Accumulated hours of use (L) of lamp=100 h
Reference temperature (T3): T3_1=73° C., T3_2=78° C., T3_3=82° C., T3_4=88° C., T3_5=104° C.

When temperature (T2) is 107° C. under the above precondition, temperature (T2) is higher than reference temperature (T3_5) (T2>T3_5). Thus, the rate of blocking of the louver and the rate of clogging of the air filter are larger than 90%. In this case, the control section determines that the louver is blocked by a foreign substance such as paper or that the air filter is heavily soiled and clogged and hence the control section stops the device.

EXAMPLE 2

Precondition

Outside air temperature (T1)=26° C.
Accumulated hours of use (L) of lamp=100 h
Reference temperature (T3): T3_1=73° C., T3_2=78° C., T3_3=82° C., T3_4=88° C., T3_5=104° C.

When temperature (T2) is 81° C. under the above precondition, temperature (T2) is higher than reference temperature (T3_2) and lower than reference temperature (T3_3) (T3_2<T2<T3_3). Thus, the rate of clogging of the air filter is larger than 0% but not larger than 30%. In this case, the control section determines that the air filter is being normally operated and hence continues the operation of the device as is.

EXAMPLE 3

Precondition

Outside air temperature (T1)=32° C.
Accumulated hours of use (L) of lamp=1600 h
Reference temperature (T3): T3_1=67.5° C., T3_2=72.5° C., T3_3=76.5° C., T3_4=82.5° C., T3_5=98.5° C.

When temperature (T2) is 80° C. under the above precondition, temperature (T2) is higher than reference temperature (T3_3) and lower than reference temperature (T3_4) (T3_3<T2<T3_4). Thus, the rate of clogging of the air filter is larger than 30% but not larger than 50%. In this case, the control section determines that the air filter needs to be cleaned and projects a message on the screen for ten seconds to indicate that the air filter needs to be cleaned. In this case, the operation of the device is continued as is.

EXAMPLE 4

Precondition

Outside air temperature (T1)=32° C.
Accumulated hours of use (L) of lamp=1600 h
Reference temperature (T3): T3_1=67.5° C., T3_2=72.5° C., T3_3=76.5° C., T3_4=82.5° C., T3_5=98.5° C.

When temperature (T2) is 68° C. under the above precondition, temperature (T2) is higher than reference temperature (T3_1) and lower than reference temperature (T3_2) (T3_1<T2<T3_2). In this case, the control section determines that the air filter is detached and projects a message on the screen for ten seconds to indicate that the air filter is detached and then stops the device.

Embodiment 2

Next, another example of an embodiment of a projection type display device of the present invention will be described. A projection type display device according to the present embodiment has the same structure as the projection type display device according to embodiment 1. Thus, the projection type display device according to the present embodiment will be described, as required, with reference to FIG. 1 to FIG. 10.

A different point between the projection type display device according to the present embodiment and the projection type display device according to embodiment 1 is as follows. In embodiment 1, reference temperature (T3) to be compared with temperature (T2) is selected from among the plurality of reference temperatures (T3_1, T3_2, T3_3, T3_4, and T3_5) in response to outside air temperature (T1) and the accumulated hours of use (L) of the lamp. On other hand, in the present embodiment, reference temperature (T3) to be compared with temperature (T2) is fixed. Specifically, reference temperature (T3) is set at 106° C. The control section stops the operation of the device when temperature (T2) is 106° C. or more.

The projection type display device according to the present embodiment is effective in a case in which specific numerical values shown in FIG. 8 and FIG. 9 cannot be previously stored in the storage section because the storage section does not have a sufficient storage capacity.

In the present invention, the operation of the device is controlled on the basis of the result of comparison of temperature (T2) of PBS 21 and reference temperature (T3). However, temperature (T2) of PBS 21 varies not only due to a decrease in the volume of the cooling air but also due to an increase in outside air temperature (T1) and degradation of the lamp. Specifically, when outside air temperature (T1) is increased, the temperature (T2) of PBS 21 is also increased. On the other hand, generally, when the distance between the electrodes of the lamp is increased and unnecessary light is increased, temperature (T2) of PBS 21 is decreased. Thus, even if the air filter is not clogged, when outside air temperature (T1) is increased, it could be that temperature (T2) of PBS 21 exceeds reference temperature (T3). On the other hand, even if the air filter is clogged, when the lamp is degraded, it could be that temperature (T2) of PBS 21 does not reach reference temperature (T3).

Therefore, in embodiment 1, reference temperature (T3) to be compared with temperature (T2) of PBS 21 is selected from among the plurality of reference temperatures (T3_1 to T3_5) on the basis of the accumulated hours of use (L) of the lamp.

On the other hand, in the present embodiment, reference temperature (T3) to be compared with temperature (T2) of PBS 21 is fixed at only one value. However, in the present embodiment, the number of revolutions of each of sirocco fans 11R, 12G, 23B shown in FIG. 5 and the other drawings is controlled on the basis of outside air temperature (T1). Specifically, the number of revolutions of each of the sirocco fans is controlled in such a way that even if outside air temperature (T1) is increased, the temperature of each liquid crystal panel is held constant. Thus, when outside air temperature (T1) is increased, the number of revolutions of sirocco fan 23B to produce cooling air 29 to be supplied to PBS 21 is increased. As a result, the amount of increase in temperature (T2) of PBS 21 is small with respect to the amount of increase in outside air temperature (T1). Specifically, even if outside air temperature (T1) varies by 5° C., temperature (T2) of PBS 21 will only vary by about 2° C.

Furthermore, when the amount of unnecessary light is increased because of the degradation of the lamp, the amount of light intercepted by light intercepting portion 42 provided in aluminum plate 31 is increased. When the amount of the unnecessary light is increased, the temperature of PBS 21 is decreased, but the temperature of aluminum plate 31 having PBS 21 bonded thereto is increased. Temperature sensor 22 is fixed to aluminum plate 31, so that even if the lamp is degraded, temperature (T2) detected by temperature sensor 22 does not vary greatly.

As described above, even if reference temperature (T3) to be compared with temperature (T2) detected by temperature sensor 22 is fixed, the operation of the device can be controlled without being influenced by outside air temperature (T1) and degradation of the lamp.

The invention claimed is:

1. A projection type display device including a lamp, a polarization element that subjects light emitted from the lamp to a polarization conversion, a liquid crystal panel for modulating the light subjected to the polarization conversion to form an image light, and a projection lens for projecting the image light, the projection type display device comprising:
    fans for taking outside air in and for supplying the outside air taken in to the liquid crystal panel;
    filters that each collect dust in the outside air taken in by the fans;
    a first detector that detects a temperature (T1) of the outside air;
    a first controller that controls a number of revolutions of the fans in a response to said temperature (T1);
    a second detector that detects a temperature (T2) of the polarization element;
    a storage element that stores a reference temperature (T3) to be compared with said temperature (T2); and
    a second controller that controls an operation of the projection type display device,
    wherein the polarization element comprises an integrator lens, a metal plate with a light intercepting portion, and a polarization conversion element,
    wherein said second detector is fixed to said metal plate,
    wherein at least one of said fans supplies the outside air to the liquid crystal panel and the polarization element, and
    wherein the second controller compares said temperature (T2) with said reference temperature (T3) and stops the operation of the projection type display device when said temperature (T2) is equal to said reference temperature (T3) or higher than said reference temperature (T3).

2. The projection type display device as claimed in claim 1, wherein the storage element stores two or more reference temperatures (T3) related to said temperature (T1), and
    wherein the second controller reads out a reference temperature (T3) corresponding to said temperature (T1) from among said two or more reference temperatures (T3) and compares said reference temperature (T3) read out with said temperature (T2).

3. The projection type display device as claimed in claim 1, further comprising:
    a counter that accumulates hours of a use of the lamp and that stores accumulated hours of the use (L),
    wherein the storage element stores two or more reference temperatures (T3) related to said accumulated hours of the use (L), and
    wherein the second controller reads out a reference temperature (T3) corresponding to said accumulated hours of the use (L) from among the two or more reference temperatures (T3) and compares said reference temperature (T3) read out with said temperature (T2).

4. The projection type display device as claimed in claim 1, further comprising:
    a counter that accumulates hours of a use of the lamp and for storing accumulated hours of a use (L),
    wherein the storage element stores two or more reference temperatures (T3) related to said temperature (T1) and said accumulated hours of the use (L), and
    wherein the second controller reads out a reference temperature (T3) corresponding to said temperature (T1) and said accumulated hours of the use (L) from among said two or more reference temperatures (T3) and compares said reference temperature (T3) read out with said temperature (T2).

5. The projection type display device as claimed in claim 1, wherein the second controller projects a specified image according to a result of a comparison of said temperature (T2) and said reference temperature (T3).

6. The projection type display device as claimed in claim 2, wherein the second controller projects a specified image according to a result of a comparison of said temperature (T2) and said reference temperature (T3).

7. The projection type display device as claimed in claim 3, wherein the second controller projects a specified image according to a result of a comparison of said temperature (T2) and said reference temperature (T3).

8. The projection type display device as claimed in claim 4, wherein the second controller projects a specified image according to a result of a comparison of said temperature (T2) and said reference temperature (T3).

9. The projection type display device as claimed in claim 1, wherein said fans comprise first, second, and third fans that respectively supply the outside air to a red optical path of the liquid crystal panel, a green optical path of the liquid crystal panel, and a blue optical path of the liquid crystal panel.

10. The projection type display device as claimed in claim 9, wherein the third fan comprises the at least one of said fans that supply the outside air to the blue optical path of the liquid crystal panel and the polarization element.

11. A method for detecting clogging of filters in a projection type display device which comprises a lamp, a polarization element that subjects light emitted from the lamp to a polarization conversion, a liquid crystal panel for modulating the light subjected to the polarization conversion to form an image light, a projection lens for projecting the image light, fans for taking outside air in and for supplying the outside air taken in to the liquid crystal panel, and filters that each collect dust in the outside air taken in by the fans, wherein at least one of said fans supplies the outside air to the liquid crystal panel and the polarization element, wherein the polarization element comprises an integrator lens, a metal plate with a light intercepting portion, and a polarization conversion element, and wherein the projection type display device comprises a detector that detects a temperature (T2) of the polarization element, the method comprising:

detecting the temperature (T2) of the polarization element;

comparing the temperature (T2) with a reference temperature (T3);

determining that the filters are clogged when said temperature (T2) is equal to said reference temperature (T3) or higher than said reference temperature (T3); and stopping an operation of the projection type display device, wherein the projection type display device further comprises a detector that is fixed to said metal plate and detects the temperature (T2) of the polarization element.

12. The method as claimed in claim 11, wherein said fans comprise first, second, and third fans that respectively supply the outside air to a red optical path of the liquid crystal panel, a green optical path of the liquid crystal panel, and a blue optical path of the liquid crystal panel.

13. The method as claimed in claim 12, wherein the third fan comprises the at least one of said fans that supply the outside air to the blue optical path of the liquid crystal panel and the polarization element.

14. A method for detecting clogging of filters in a projection type display device which comprises a lamp, a polarization element that subjects light emitted from the lamp to a polarization conversion, a liquid crystal panel for modulating the light subjected to the polarization conversion to form an image light, a projection lens for projecting the image light, fans for taking outside air in and for supplying the outside air taken in to the liquid crystal panel, and filters that each collect dust in the outside air taken in by the fans, wherein at least one of said fans supplies the outside air to the liquid crystal panel and the polarization element, wherein the polarization element comprises an integrator lens, a metal plate with a light intercepting portion, and a polarization conversion element, and wherein the projection type display device comprises a detector that detects a temperature (T2) of the polarization element, the method comprising:

controlling a number of revolutions of the fans in a response to a temperature of the outside air;

detecting the temperature (T2) of the polarization element;

comparing the temperature (T2) with a reference temperature (T3);

determining that the filters are clogged when said temperature (T2) is equal to said reference temperature (T3) or higher than said reference temperature (T3); and stopping an operation of the projection type display device.

\* \* \* \* \*